United States Patent [19]

Curry

[11] 4,212,365
[45] Jul. 15, 1980

[54] ARTICULATING MINE CAR COUPLING

[76] Inventor: Paul F. Curry, P.O. Box 775, Glade Spring, Va. 24340

[21] Appl. No.: 942,899

[22] Filed: Sep. 18, 1978

[51] Int. Cl.² ............... B62D 11/00; B62D 13/02
[52] U.S. Cl. ................... 180/139; 280/490 R; 280/492; 414/485; 414/483
[58] Field of Search .......... 180/139, 77 MC, 134, 180/135, 136, 137, 138; 280/492, 490 R, 493; 414/482, 483, 484, 485

[56] References Cited

U.S. PATENT DOCUMENTS

| 2,557,203 | 6/1951 | Rehberger | 414/484 |
|---|---|---|---|
| 2,754,987 | 7/1956 | Kern | 414/483 |
| 3,095,570 | 6/1963 | Warner | 414/528 |
| 3,435,969 | 4/1969 | McCartney | 414/536 |
| 3,446,175 | 5/1969 | Boehler | 180/139 |
| 3,455,474 | 7/1969 | Truncali | 414/485 |
| 3,526,331 | 9/1970 | Marshall | 414/491 |
| 3,780,894 | 12/1973 | Holmes | 298/23 A |
| 4,130,211 | 12/1978 | Abascal | 414/483 |
| 4,133,440 | 1/1979 | Heidrick | 414/483 |

FOREIGN PATENT DOCUMENTS 735541  4/1943  Fed. Rep. of Germany ...... 280/490 R

Primary Examiner—John P. Silverstrim
Attorney, Agent, or Firm—Lane, Aitken & Ziems

[57] ABSTRACT

An articulating coupling for connecting two wheeled vehicles includes a pivot connection and a tilt mechanism. The pivot connection is provided between the two vehicles so that they can turn relative to each other in the horizontal plane and be selectively turned relative to each other. The tilt mechanism includes a horizontal pivot connection between the two vehicles so that vertical movement of at least a portion of one vehicle adjacent to the horizontal pivot connection will move a portion of the other vehicle adjacent to the pivot connection in the same direction and cause the other vehicle to pivot about the axis of its wheels.

4 Claims, 7 Drawing Figures

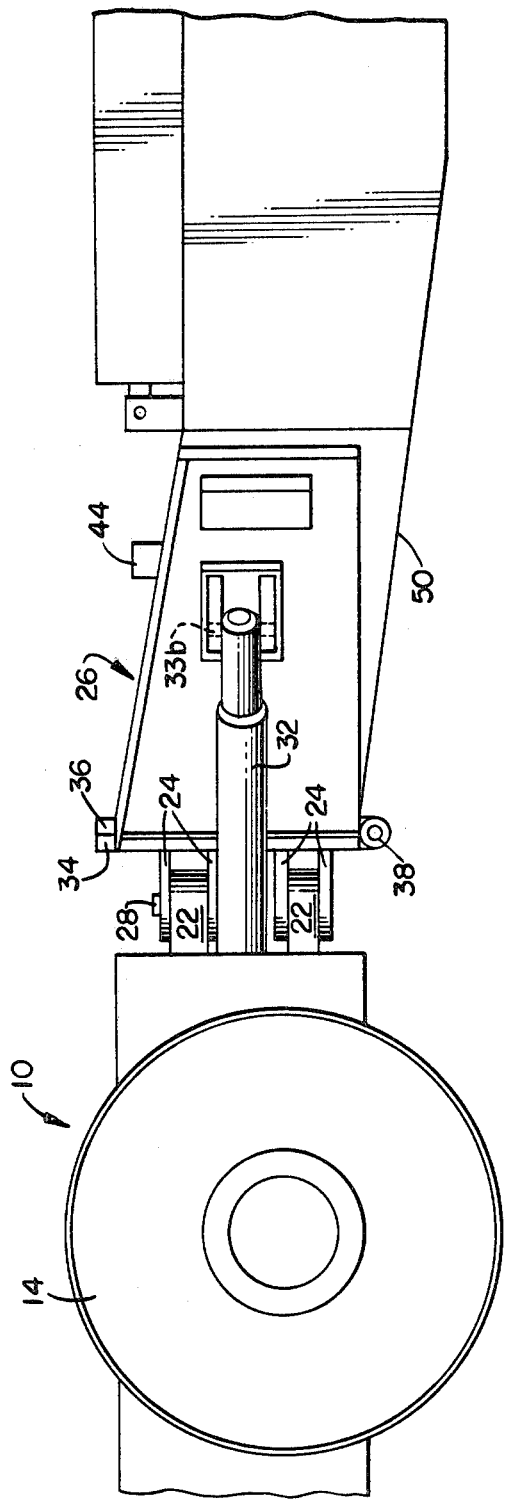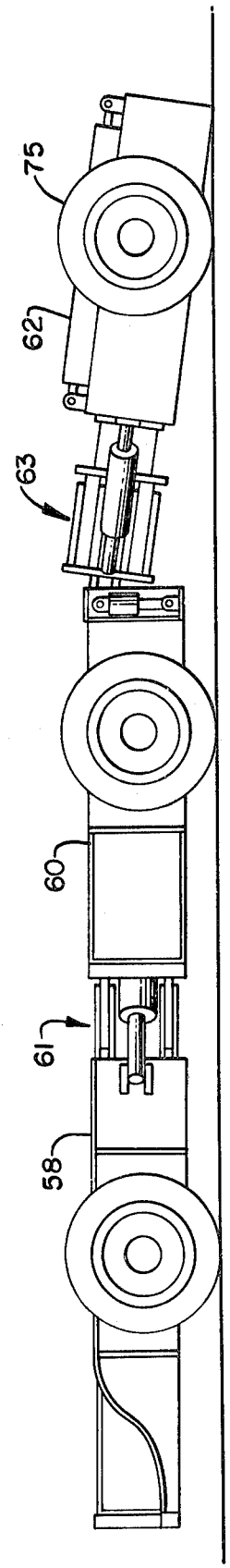

ARTICULATING MINE CAR COUPLING

BACKGROUND OF THE INVENTION

This invention relates to vehicles which are specially designed for use in underground coal mines and, more particularly, to a joint for connecting two mine car vehicles which allows them to move laterally and vertically relative to each other.

It is known to connect a two-wheeled tractor portion of a mine shuttle car with a trailer which has two or more wheels through a pivot connection so that hydraulically operated cylinders can be used to turn one relative to the other for maneuvering them around sharp corners. In these mine vehicles, however, there is no provision for tilting the trailer to facilitate loading.

In one embodiment of such an arrangement where a tractor and trailer are use to move roof supports from one location in a mine to another, it is extremely burdensome to load a roof support onto a trailer where the rear-end portion of the trailer is raised above the ground.

In another form of mine vehicle where a load carrying frame or bucket is connected to the tractor, the bucket is normally raised and lowered to scoop up coal or other materials through a hydraulic mechanism. The load carrying capacity of known devices of this type is limited because the bucket is not self-supporting, but must be carried by the tractor.

SUMMARY OF THE INVENTION

The subject invention solves the problems discussed above by providing an articulating joint or coupling between two wheeled mine vehicles which provides the lateral turning capability mentioned above as well as a tilting action through relative vertical movement between the vehicles so that the rear-end portion of the trailing vehicle can be lowered to engage the underground surface to facilitate loading.

The articulated joint includes a swivel or pivot connection between the two cars with a hydraulic piston and cylinder arrangement located on either side so that the operator can control the relative turning movement of the cars.

The joint also includes a tilt mechanism that includes a connection which allows a portion of one car to move upward relative to the other car. This action operates to raise the adjacent end of the other car which, consequently, lowers the outer end to the ground. One or more hydraulic cylinders can be provided between the cars for controlling this relative vertical movement.

The invention has obvious advantages for loading roof supports on a trailer and, in addition, provides a significantly greater load carrying capability for a bucket assembly since it can be mounted on wheels and still be raised and lowered.

BRIEF DESCRIPTION OF THE DRAWINGS

The objects, features and advantages of the invention will become apparent from the following detailed description of the preferred embodiments when taken in conjunction with the accompanying drawings, in which:

FIG. 4 is a side plan view of the articulated joint of FIG. 3;

FIG. 5 is a front plan view of a six-wheeled battery-carrier, tractor and bucket arrangement showing another embodiment of the articulating joint where the joint is actuated so the wheeled bucket can be loaded;

DETAILED DESCRIPTION OF THE PREFERRED EMBODIMENTS

Figure 1:
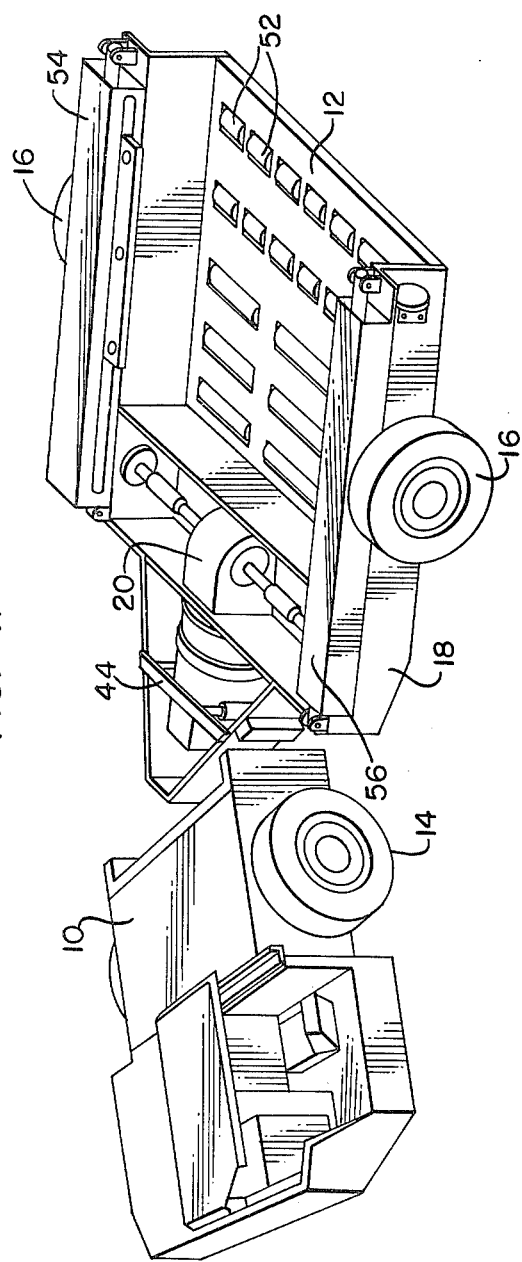
FIG. 1 is a perspective view of a four-wheeled tractor and trailer turned relative to each other connected by means of one embodiment of the articulated joint.

Now, referring to FIGS. 1-4, one embodiment of the invention will be described in detail. Reference numeral 10 has been used to designate a tractor and reference numeral 12 a trailer of an underground mine vehicle. The tractor is equipped with a motor (not shown) for driving a pair of wheels 14 through appropriate gearing (not shown). An electric motor (not shown) is provided for driving a hydraulic pump (not shown) for providing the necessary fluid power for the various hydraulic units of the machine, the ones relevant to the invention being described in detail below.

The trailer 12 is provided with a pair of wheels 16 which are driven by a chain drive 18 connected to a motorized drive unit 20 which is synchronized with the drive system for the tractor 10 so all four wheels 14 and 16 can be driven together. Since these drive mechanisms are known in the art, they will not be described in any greater detail.

Figure 3:
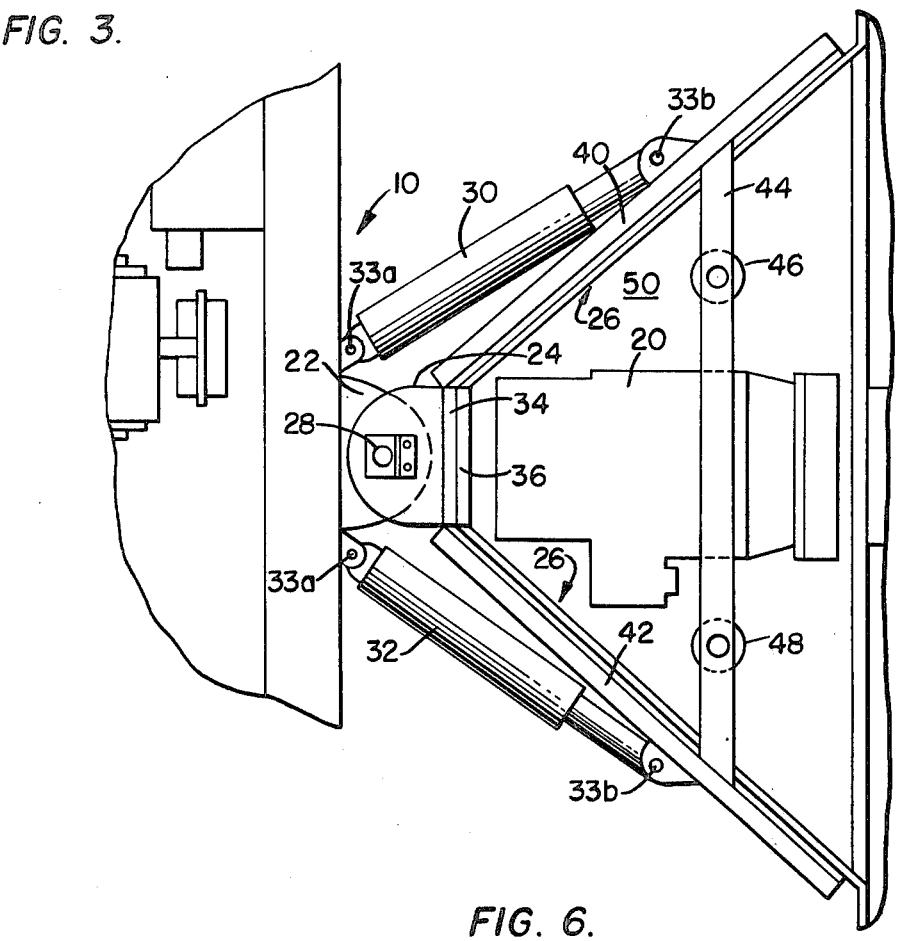
FIG. 3 is a top plan view of the embodiment of the articulated joint shown in FIGS. 1 and 2.

In order to turn the tractor 10 relative to the trailer 12 as shown in FIG. 1, the two vehicles are connected through a swivel or pivot mechanism shown in detail in FIGS. 3 and 4. The pivot mechanism includes a latch 22 projecting from the rear end of the tractor 10, which is sized and located to cooperate with a second latch 24 which projects from the front end of a housing 26 for the drive unit 20 of the trailer 12. Details of the connection between the latch 24 and the housing 26 will be described in detail below. The latches 22 and 24 are provided with cooperating vertical openings which can be lined-up with each other and receive a pivot pin 28 for connecting the two vehicles together for relative pivotal or turning movement about a vertical coupling axis defined by the pin 28. An appropriate locking mechanism (not shown) can be provided to prevent the pivot pin 28 from inadvertently being jarred loose from the opening.

A pair of extensible power units in the form of hydraulic piston and cylinder mechanisms 30 and 32 are pivotally connected between the tractor 10 through pivot pins 33a and the trailer 12 through pivot pins 33b for controlling the turning movement of the two vehicles. In this way, the operator of the tractor 10 can easily maneuver the vehicles around sharp corners and through the narrow openings common in underground coal mines. The hydraulic hoses and other operational details of the piston and cylinder mechanisms 30 and 32 will not be described in detail since they are known in the art.

Figure 2:
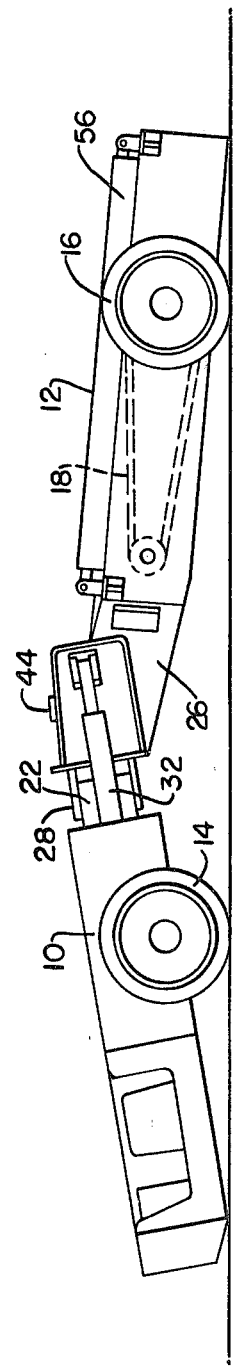
FIG. 2 is a front plan view of the tractor and trailer of FIG. 1, showing their relative positions when the tilt mechanism portion of the articulating joint is actuated so that the rear-end of the trailer will engage the main floor.

The articulating joint or coupling also includes a tilt mechanism which operates to raise the end of the trailer 12 adjacent to the tractor 10 so that the trailer will pivot about the axis of the wheels 16 and cause the rear end of the trailer 12 to move downwardly and engage the mine floor as shown in FIG. 2. In this way, materials can be easily loaded into the trailer which is provided with wheels to increase its carrying capacity.

The tilt mechanism, as best shown in FIG. 4, is formed of a pair of normally abutting, vertical hinge plates 34 and 36. The plate 34 is connected to the rear end of the tractor 10 through the latches 24 and 26, the plate 36 being connected to the front end of the trailer 12 and forming part of the drive unit housing 26 which defines a rigid, forwardly tapering projection of the front end of the trailer vehicle 12. The plates 34 and 36 are pivotally connected at their lowermost ends by means of a hinge pin 38 as shown in FIG. 4 for relative movement about a horizontal coupling axis defined by the pin 38. Each of the plates 34 and 36 is half-welded to the hinge pin 38 and rotatable relative to the other plate. As shown in FIGS. 3 and 4, the plate 34 is connected directly to the latch 24 by welding or the like and to a pair of rearwardly diverging, vertical steel wall plates 40 and 42 which are connected to the rear end of the tractor 10 through the piston and cylinder mechanisms 30 and 32. Specifically and as may be seen in FIGS. 1-4, the wall plates 40 and 42 are welded or otherwise fixed at their front ends to opposite side edges of the hinge plate 34 and extend rearwardly past the hinge plate 36 along opposite sides of the housing 26 in a manner generally complementing the tapered configuration of the housing 26. The plate 36 is formed as part of the drive unit housing 26 and is rigidly connected to the other walls of the housing 26 by welding or the like.

A cross-piece 44 is rigidly connected between the steel plates 40 and 42 and a pair of extensible power units in the form of hydraulically-operated piston and cylinder mechanisms 46 and 48 are located between the cross-piece 44 and a bottom plate 50 of the housing 26. As shown in FIGS. 1 and 3, the cross piece overlies the housing 26 and is spaced horizontally to the rear of the hinge plates 34 and 36 or on the opposite side of the horizontal pivot axis defined by the hinge pin 38 from the vertical pivot axis defined by the pin 28. In order to tilt the trailer 12 and lower its rear end to the mine floor the piston and cylinder mechanisms 46 and 48 are actuated, which operates to raise the cross-piece 44 and accordingly the rear end of the tractor 10 so that the tractor 10 will pivot about the axis of the wheels 14 as shown in FIG. 2. Raising of the rear end of the tractor 10 will cause the front end of the trailer 12 to be raised and the upper ends of the hinge plates 34 and 36 to move apart. The trailer 12 will pivot about the axis of the wheels 16 so that its rear end will be lowered to the mine floor for easy loading.

As shown in FIG. 1, the trailer 12 can be provided with a plurality of rollers 52 in its bed so that solid objects such as roof supports can be rolled along the bed. Another pair of hydraulically-operated piston and cylinder mechanisms located in protective housings 54 and 56 on the sides of the trailer 12 can be provided to pull the roof supports onto the trailer 12.

Figure 6:
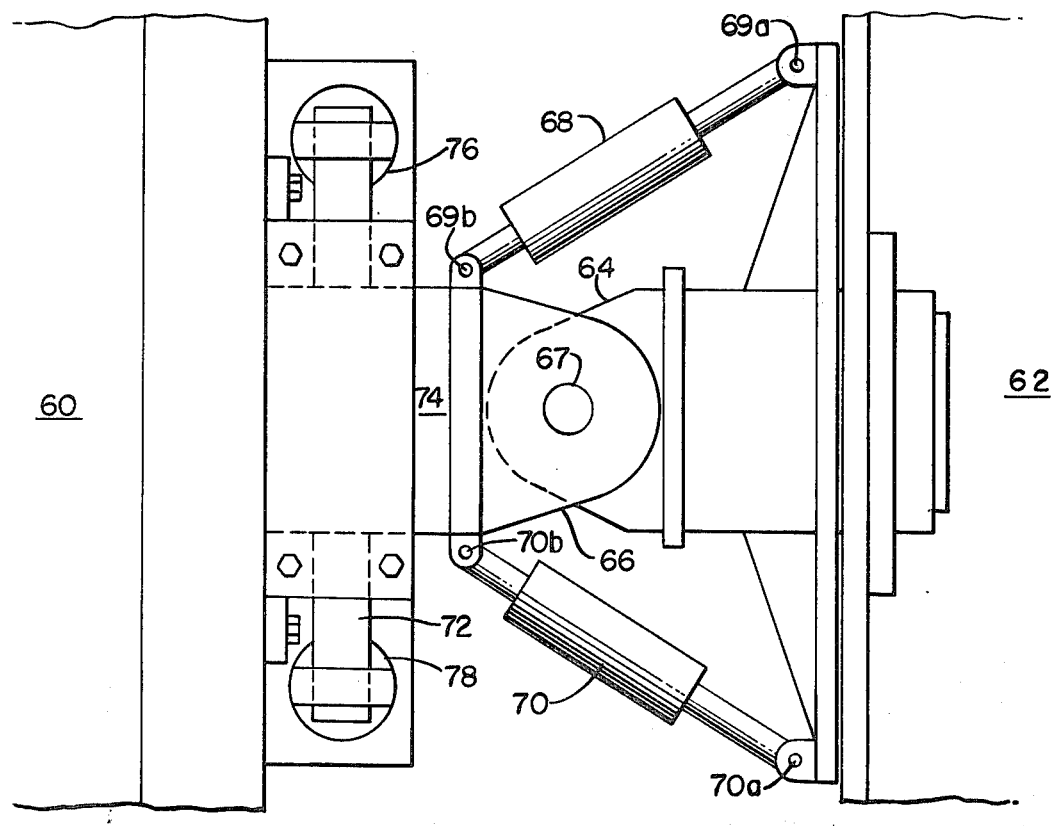
FIG. 6 is a top plan view of the embodiment of the joint shown in FIG. 5.
Figure 7:
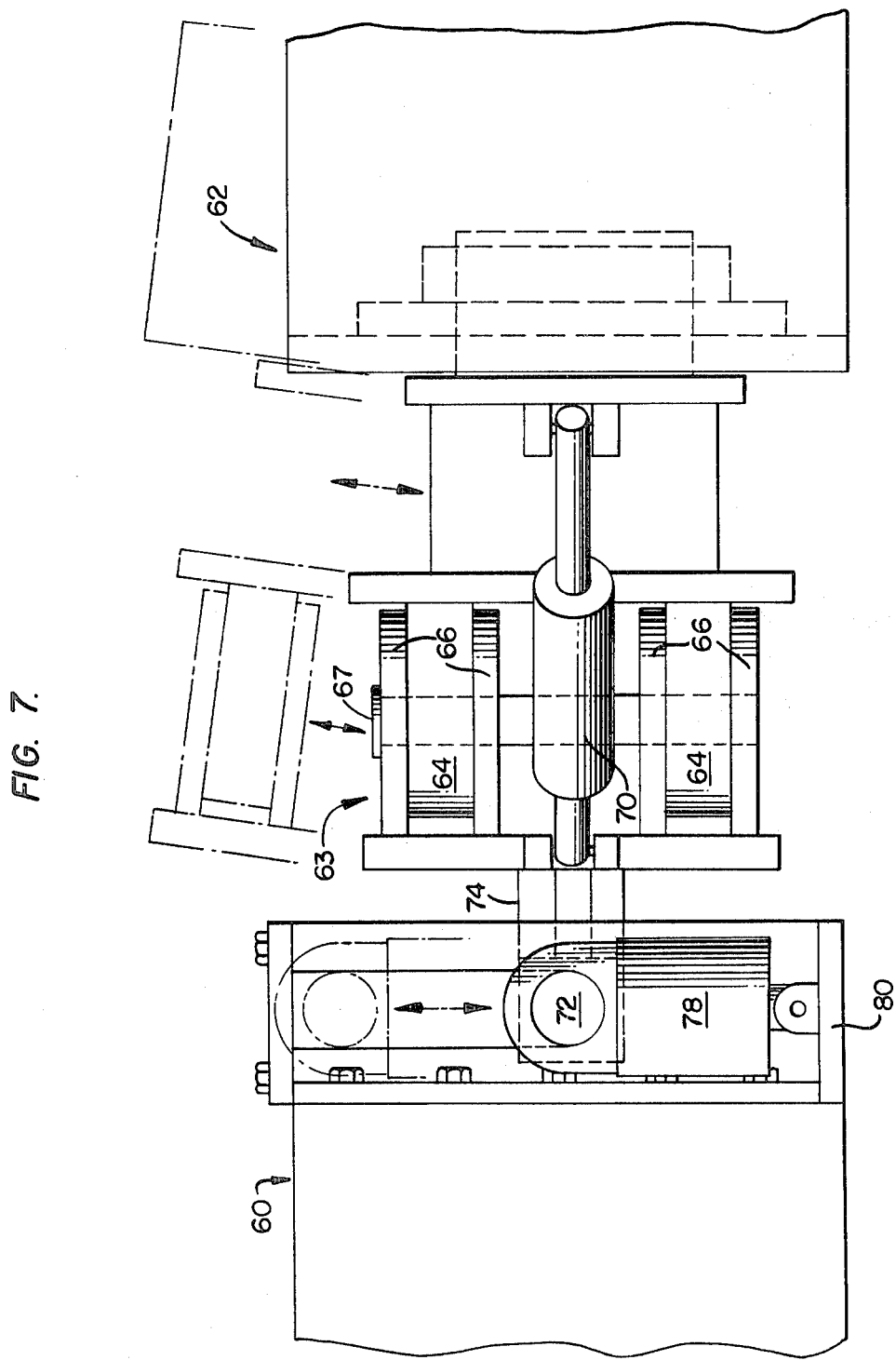
FIG. 7 is a side plan view of the joint shown in FIG. 6.

A second embodiment of the invention is shown in FIGS. 5-7 where a six-wheeled mine vehicle is shown which includes a battery carrier 58, a tractor 60 and a bucket or load carrying frame 62. The battery carrier 58 and tractor 60 are connected to each other through a conventional swivel or pivot joint 61 which allows them to turn relative to each other, while the tractor 60 and bucket 62 are connected through an articulated joint 63 which allows both turning as well as a tilting movement and represents a second preferred embodiment of the subject invention.

Referring to FIGS. 6 and 7, the articulated joint 63 includes a pivot connection formed of a latch connected to the bucket 62 and a latch 66 which is connected to the tractor 60, the two latches including cooperating vertical openings which can be aligned to receive a pivot pin 68 for providing the same type of relative turning movement described above in conjunction with FIGS. 1-4. A pair of hydraulic piston and cylinder mechanisms 68 and 70 are connected to the tractor 60 through pivot pins 69a and 70a and to the bucket 62 through pivot pins 69b and 70b to control the relative turning movement the same way as described above.

The tilting action of the joint 63 is caused by sliding vertical movement between a horizontally disposed rod 72 which is connected through an arm 74 (which is pivotally mounted on the rod 72) and the swivel joint to the rear end of the bucket 62 so that when the rod 72 is raised or lowered the rear end of the bucket 62 will likewise be raised or lowered. As shown in FIG. 5, raising of the rear end of the bucket 62 will cause the bucket to pivot about the axis of its wheels 75 and lower the front end of the bucket.

The raising and lowering of the rod 72 is accomplished by means of a pair of hydraulically-operated piston and cylinder mechanism 76 and 78 which are connected to a plate 80 projecting from the rear end of the tractor 60. The cylinders of the hydraulic mechanisms 76 and 78 move up and down relative to the rear end of the tractor 60, which in turn caused the rod 72 to move and raise and lower the front end of the bucket 62, as shown by the broken lines in FIG. 7.

Thus, instead of using conventional means for raising and lowering a loading bucket without wheels where the full weight of the bucket is carried by the tractor, the tilt mechanism described above operates to raise and lower the rear end of the bucket in a way that it can pivot about a set of wheels so that wheels can be used in transporting the bucket which significantly increases its load-carrying capacity.

Thus, the invention provides a useful coupling for mine cars which allow the cars to maneuver around sharp corners and also to lower the outer end of a trailer or bucket-type wheeled mine vehicle. The tilting action enables the vehicle to be easily loaded and unloaded and for bucket applications provides the capability for carrying greater loads since the bucket can be supported on a set of wheels instead of being soley supported by a tractor.

The embodiment of the invention described above is intended to be merely exemplary and those skilled in the art will be able to make modifications and variations without departing from the spirit and scope of the appended claims. All such modifications and variations are contemplated as failling within the scope of the claims.

I claim:

1. An articulating coupling for connecting two wheeled vehicles, comprising:
   vertical pivot means to connect the two vehicles for relative turning movement in a horizontal plane;
   means for selectively turning the vehicles about said vertical pivot means;

horizontal pivot means to connect the two vehicles for tilting movement relative to each other, said horizontal pivot means comprising a pair of normally abutting, vertical hinge plates, means for connecting one of said hinge plates rigidly to one of the vehicles, means for connecting the other of said hinge plates to said vertical pivot means, a hinge pin pivotally connecting the lower ends of said plates to each other, and a pair of vertical wall plates connected to opposite sides of said other hinge plate and extending said other hinge plate past said one hinge plate toward said one vehicle; said means for selectively turning the vehicles comprising a pair of extensible power units on opposite sides of said vertical pivot means and operative between said other vehicle and said wall plates to forcibly pivot said wall plates relative to said other vehicle about said vertical pivot means; and tilting means including at least one further extensible power unit operative between said one vehicle and said wall plates to pivot said hinge plates out of normal abutting relationship and raise the respective portions of the vehicles connected by the coupling.

2. A coupling for interconnecting a pair of two-wheel mine vehicles in end-for-end relationship and in a manner to provide for articulated turning and tilting movement of the vehicles in relationship to each other, said coupling comprising:

housing means defining a rigid projection of one of the vehicles and at the end thereof to be coupled;

a first vehicle hinge plate secured rigidly to the projecting end of said rigid projection;

a second vertical hinge plate positioned normally in abuttment with said first hinge plate;

means pivotally connecting the bottom edges of said first and second hinge plates and defining a horizontal coupling axis;

means to connect said second hinge plate to the other of the two vehicles for pivotal movement exclusively about a vertical coupling axis and rigidly against all other movement;

a pair of vertical wall plates connected one on each side of said second hinge plate and extending past said first hinge plate along opposite sides of said rigid projection;

a cross piece extending between and secured to said wall plates to overlie said rigid extension; said cross piece being spaced horizontally on the opposite side of said horizontal pivot axis from said vertical pivot axis; and extensible power means positioned between said rigid extension and said cross piece and operative to elevate said cross piece and said wall plates relative to said rigid extension to effect pivotal separation of said hinge plates and relative tilting movement of the vehicles about the axes of the wheels thereof, respectively.

3. The apparatus recited in claim 2, including a pair of extensible power units positioned on opposite sides of said vertical coupling axis and extending between the other of the two vehicles and said vertical wall plates.

4. The apparatus recited in either of claims 2 or 3, wherein said rigid projection tapers to said first hinge plate and wherein said wall plates diverge from said second hinge plate and lie outwardly of said rigid projection in a manner generally complementing the configuration of said rigid extension.

* * * * *